United States Patent [19]

Shih

[11] Patent Number: 5,180,406

[45] Date of Patent: Jan. 19, 1993

[54] MUFFLER FOR EXHAUST GASES OF A DIESEL ENGINE

[76] Inventor: Chin-Tai Shih, No. 76, Ku Shon 2nd Road, Ku Shon Section, Kaohsiung, Taiwan

[21] Appl. No.: 746,481

[22] Filed: Aug. 16, 1991

[51] Int. Cl.[5] .......................................... B01D 47/00
[52] U.S. Cl. ........................................ 55/232; 55/234; 55/DIG. 30; 60/310; 261/92
[58] Field of Search ......... 55/232, 234, 259, DIG. 30; 60/310; 261/92

[56] References Cited

FOREIGN PATENT DOCUMENTS

15898AD 3/1908 United Kingdom .................. 55/232

Primary Examiner—Bernard Nozick

[57] ABSTRACT

An improved exhaust gas muffler for diesel engines comprises a housing of generally oval shaped cross-chamber, a partition plate disposed therein dividing the housing into an upper chamber and a lower chamber, a first and second generally cylindrical filters rotatably secured within respective lower and upper chambers of the housing, an external rotation means such as an electric motor enabling the rotation of the first and second filters, and a quantity of alkaline cleaning fluid partially filling the lower chamber of the housing and partially immersing a lower portion of the first filter. Wherein, exhaust gas enters the lower chamber of the housing through an inlet and passes through an asbestos sleeve of the first filter permeated with cleaning fluid, which removes carbon precipitates from the exhaust gas. The exhaust gas flows into the interior of the second filter through an external conduit connecting the interior of the first filter therewith, whereby the second filter further cleans the exhaust gas and extracts cleaning fluid dissolved therein which is returned to the lower chamber through a drain in the partition plate. Exhaust gases exit the upper chamber of the housing through an outlet thereon.

21 Claims, 5 Drawing Sheets

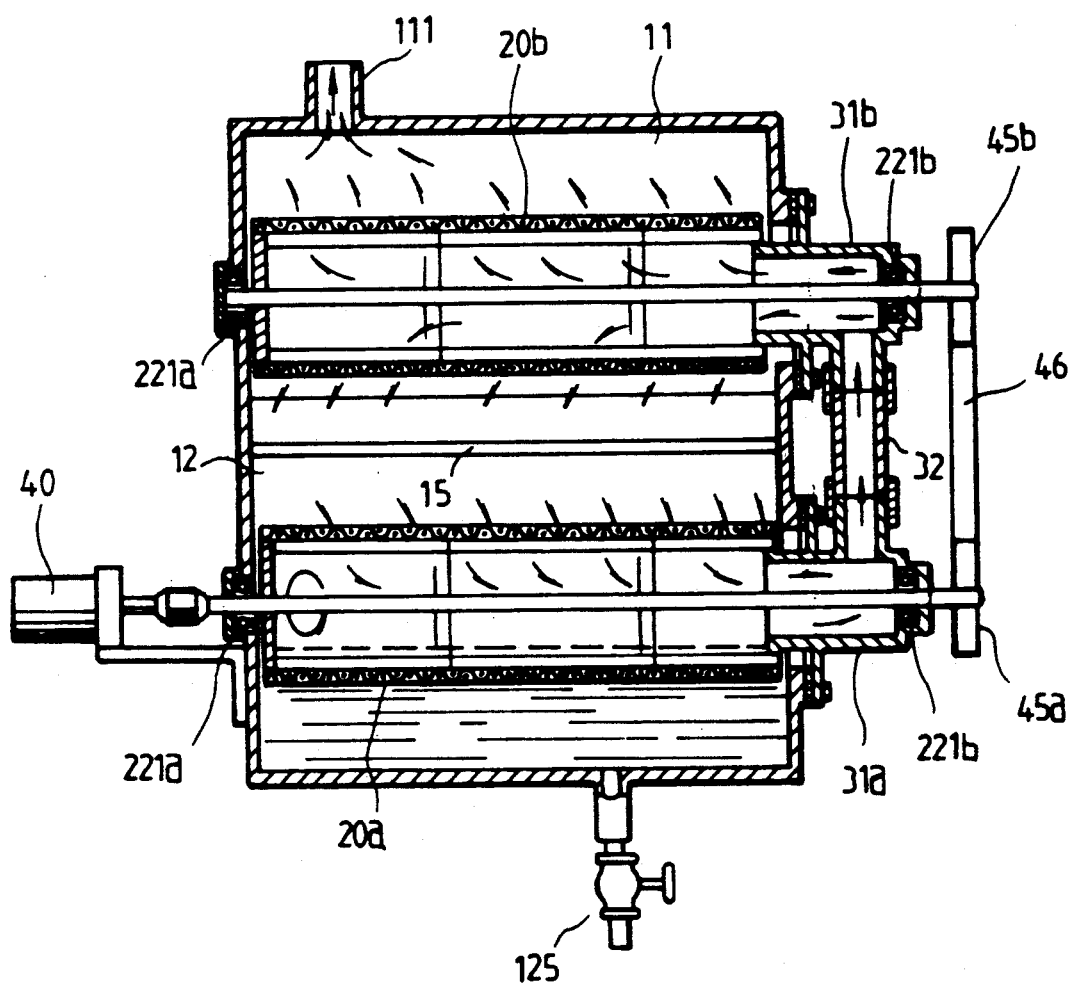
F I G. 2

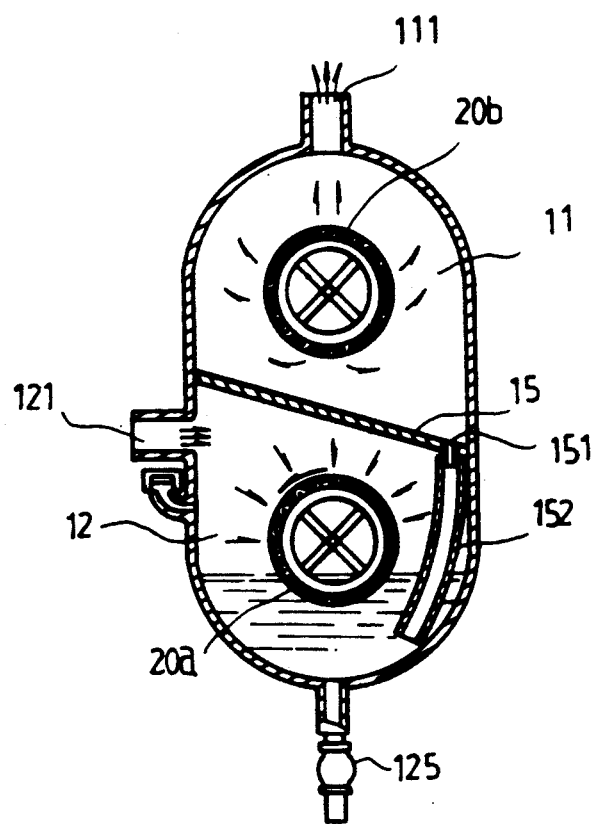
F I G. 3

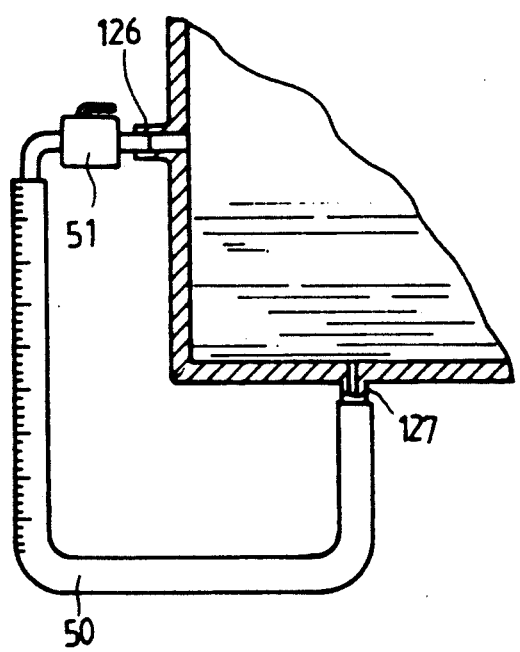
F I G. 5

MUFFLER FOR EXHAUST GASES OF A DIESEL ENGINE

BACKGROUND OF THE INVENTION

The present invention relates to a gas muffler for the cleaning of exhaust gases, and more particularly to a gas muffler adapted to be used for the cleaning of the exhaust gases of a diesel engine.

It is widely acknowledged worldwide that the exhaust fumes from internal combustion engines, and specifically those used in powering motor vehicles, are a primary cause of air pollution, with gasoline consuming Otto cycle engines and diesel oil consuming Diesel cycle engines being by far the dominant contributors.

Diesel oil consuming engines have a marked advantage over their gasoline consuming counterparts in terms of producing less noxious compounds, such as carbon monoxide, due to their higher ignition points and more efficient combustion. However, the large amounts of carbon precipitates present in their exhausts is a troublesome by-product of their usage, as is readily apparent to anyone who has seen the dark exhaust plumes emitted from a truck or bus on the road.

Devices for cleaning the exhaust gases emitted by internal combustion engines are well known from the prior art, with a multitude of apparati using various techniques having been proposed over the last several decades.

In particular, the gas muffler of the present invention can be categorized with those devices which pass exhaust gas from an internal combustion engine through a rotating drum or cylinder shaped filter member and which applies a liquid cleaning agent to extract the pollutants therefrom.

Related devices include U.S. Pat. Nos. 1,637,516 (1926) to Brilliant, 3,214,902 (1965) to Maring, and 3,712,031 (1973) to Santa Cruz.

In the muffler disclosed by Brilliant a cylindrical filter member is rotated by an internal propellor powered by the flow of exhaust gases therethrough, with the filter member being continuously supplied with cleaning water from a reservoir through a float operated valve.

In the exhaust treating device of Maring, exhaust gases are mixed with atmospheric air and post-combusted within a chamber, and subsequently washed with a cleaning fluid. This being a device primarily suited for gasoline consuming engines which produce large quantities partially oxidized compounds, such as carbon monoxide and nitrous oxide.

The more recent anti-smog and exhaust device disclosed by Santa Cruz passes exhaust gases longitudinally through a rotating cylindrical filter member, supplied with cleaning fluid from a separate reservoir through an external pump, with a final cleaning imparted to the exhaust gases by a spraying rinse before expulsion therefrom.

The gas muffler of the present invention differs from those of the prior art in providing two independent but singly housed rotating filter members which clean the exhaust gases passing therethrough twice, with a second filter member therein serving also to extract and return cleaning fluid vaporized by the hot exhaust gases passing through a first filter member thereof.

No separate reservoir or pump for the cleaning fluid contained therein is required and all components are contained by a single housing, with the exception of an external drive source which can be derived directly from the engine.

As such, the gas muffler of the present invention provides a thorough and efficient cleaning action to the exhaust gases of a diesel engine, and has a relatively simple and compact structure.

SUMMARY OF THE INVENTION

The primary objective of the gas muffler for exhaust gases of the present invention is to provide a gas muffler that extracts the carbon precipitates present in the exhaust gases of the diesel engine along with absorbing noxious compounds present therein.

The gas muffler for diesel engines of the present invention comprises a housing with the interior thereof divided into a lower chamber and an upper chamber by a partition plate disposed therein, a first and second generally cylindrical filter members rotatingly secured in respective lower and upper chambers, an external gas conduit with the open ends thereof in communication with the hollow interiors of respective filter members, and an external drive source for affecting the rotation of the filter members, such as an electric motor.

Each filter member comprises a central shaft, a holder frame secured thereto, and a gas permeable filter sleeve made from a fibrous material such as asbestos cloth, secured over the holder frame.

A first end portion of the shafts of both filter members extends through respective coupler portions of the gas conduit assembly which are in communication with the interiors thereof. A pulley wheel is secured to the protruding terminal ends of the shafts and a pulley belt disposed thereover to rotatingly engage the first and second filter members.

A second end portion of the shaft of the first filter member extends through a side portion of the housing opposite from the gas conduit assembly, with the terminal end thereof being coupled to the drive source.

The lower chamber is filled with a pre-determined amount of a cleaning fluid of suitable composition through a filling pipe provided on a side portion of the housing, with the cleaning fluid partially immersing the filter member.

In operation, exhaust gases from the diesel engine enter the interior of the lower chamber through an inlet pipe provided on a side portion of the housing. The exhaust gases pass through the filter sleeve of the first filter member which is permeated with cleaning fluid and into the interior thereof, with carbon precipitates and noxious compounds being extracted from the exhaust gas by the asbestos filter sleeve and cleaning fluid therein.

The rapid rotation of the first filter member sloughs off cleaning fluid thereon and continuously cycles the cleaning fluid therethrough.

The exhaust gases then flow through the external gas conduit assembly and into the interior of the second filter member. Vaporized cleaning fluid is condensed and absorbed in the filter sleeve thereon with the rapid rotation of the second filter member acting to slough off cleaning fluid therefrom.

The cleaning fluid in the upper chamber is collected above the partition plate and flows back to the lower chamber through a drain hole formed thereon, having an attached pipe with the opposite end thereof submerged below the cleaning fluid in the lower chamber.

The second filter member further cleans the exhaust gases passing through the filter sleeve thereon and into the interior of the upper chamber.

The cleaned exhaust gases exit the upper chamber through an outlet pipe provided on an upper portion of the housing.

A sight glass tube mounted between a pair of taps provided on a side portion and lowermost portion of the housing, respectively, enables to user to determine the amount of cleaning fluid within the lower chamber and also allows visual inspection of the cleaning fluid to determine the level of contamination therein.

A drain pipe normally closed by a valve is also provided on a lowermost portion of the housing for facilitating the changing of cleaning fluid from the lower chamber therein.

A detailed description of the structure and function of a preferred embodiment of the gas muffler for diesel engines of the present invention is provided below along with accompanying drawings.

A BRIEF DESCRIPTION OF THE DRAWINGS

FIG. 2 is a sectional view from a frontal direction of a preferred embodiment of the gas muffler for exhaust gases of a diesel engine of the present invention.

FIG. 3 is a sectional view from a side direction of a preferred embodiment of the gas muffler for exhaust gases of a diesel engine of the present invention.

FIG. 5 is a sectional view of a side portion of a chamber showing a side tap and lower tap with a valve and level measuring sight glass tube connected therebetween, of a preferred embodiment of the gas muffler for exhaust gases of a diesel engine of the present invention.

DESCRIPTION OF THE PREFERRED EMBODIMENT

Figure 1:
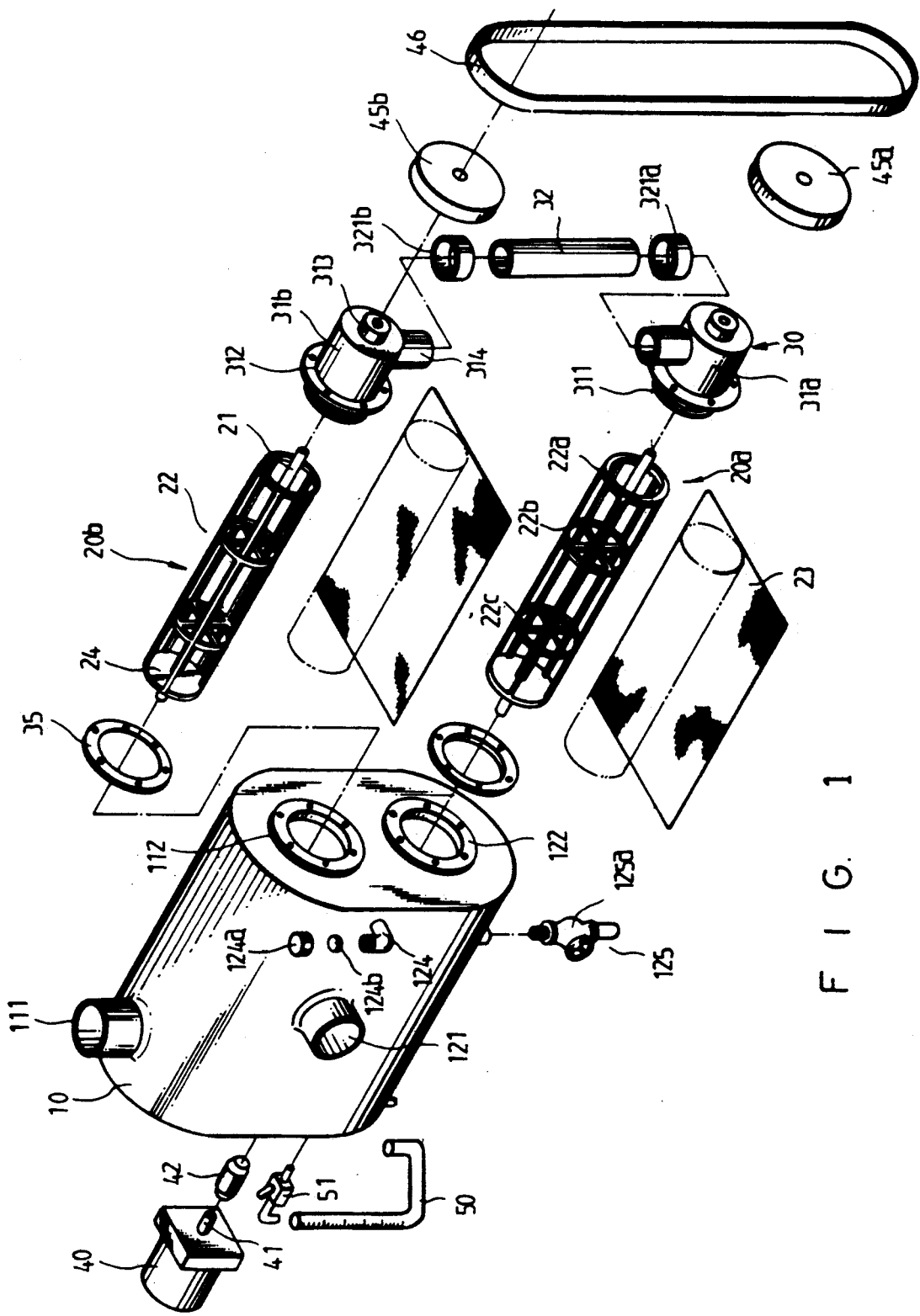
FIG. 1 is a perspective exploded view of a preferred embodiment of the gas muffler for exhaust gases of a diesel engine of the present invention.

Referring to FIG. 1, a preferred embodiment of the gas muffler for exhaust gases of a diesel engine of the present invention comprises; a housing 10 with a generally oval-shaped cross-chamber and divided into an upper chamber 11 and a lower chamber 12 by a partition plate 15 disposed therein, as shown in FIG. 3, a first and second generally cylindrical filter members, 20a and 20b, rotatably secured within respective lower and upper chambers, 12 and 11, of housing 10, an external gas conduit assembly 30 through which the hollow interiors of first and second filter members, 20a and 20b, are in communication, and an external motor 40 enabling the rotation of first filter member 20a and second filter member 20b, through a pair of pulleys wheels, 45a and 45b, rotatingly engaged by a pulley belt 46.

Filter members, 20a and 20b, each comprises a concentric shaft 21 and a holder frame 22 which includes a set of parallel annular elements 22a, longitudinal elements 22b, and cross elements 22c. Annular elements 22a are interconnected by longitudinal elements 22b which are parallel with central shaft 21, with radial cross elements 22b securing annular elements 22a to shaft 21 in concentric positions thereon.

An asbestos cloth filter sleeve 23 is wrapped over the set of annular elements 22a of each filter member, 20a and 20b, and clamped thereto.

One end of each cylindrical filter member, 20a and 20b, opposite from gas conduit assembly 30, is obturated by a circular end plate 24 secured thereon, with a respective shaft 21 extending therethrough.

Gas conduit assembly 30 comprises a pair of couplers, 31a and 31b, and a cross pipe 32 connected therebetween by a pair of threaded sealing couplings, 321a and 321b.

Each coupler, 31a and 31b, includes a flange 312 and an annular rim 311 protruding therefrom. A ferrule 314 formed on a side portion of each coupler, 31a and 31b, is releasably secured to respective ends of cross pipe 32 by threaded couplings, 321a and 321b, so that gases can pass therebetween.

Each coupler, 31a and 31b, is releasably secured over a respective circular entrance, 112 and 122, formed on a first lateral side of housing 10, which are in communication with respective upper and lower chambers, 11 and 12, therein, by a plurality of threaded fasteners.

A pair of annular gaskets 35 disposed respectively between entrances, 112 and 122, and the flanges 312 of respective couplers, 31a and 31b, form gas tight seals therebetween.

A bearing housing 313 with a central hole formed therein is also provided on an end of each coupler, 31a and 31b, opposite from and concentric with the respective flange 312 thereon.

Referring to FIGS. 1 and 2, each filter member, 20a and 20b, is rotatingly secured within respective lower and upper portions, 12 and 11, of housing 10 in a postion substantially perpendicular with the lateral side walls thereof by a respective pair of bearings, 211a and 211b.

Figure 4:
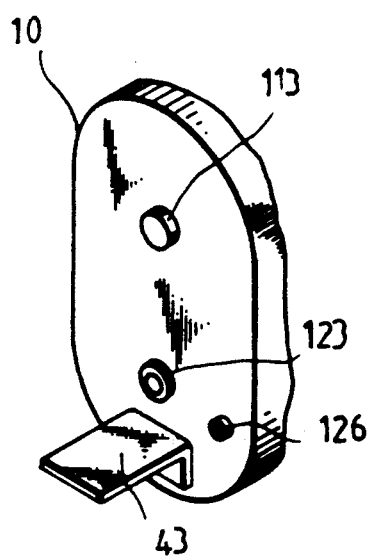
FIG. 4 is a perspective view of a side portion of a chamber, showing a mounting bracket for a motor, a pair of bearing receiving cups, and a side tap provided thereon, of a preferred embodiment of the gas muffler for exhaust gases of a diesel engine of the present invention.

Bearings 211a on corresponding ends of first and second filter members, 20a and 20b, are housed respectively in bearing receiving cups 123 and 113, formed on a second lateral side wall of housing 10, as shown in FIG. 4. Receiving cup 123 has a central hole formed therein throughwhich shaft 21 of first filter member 20a extends.

Bearings 211b on the opposite ends of first and second filter members, 20a and 20b, are housed in respective bearing housings 313 of couplers, 31a and 31b, of gas conduit assembly 30.

One end of shaft 21 of first filter member 20a extends through the central hole of receiving cup 123 on the second lateral side wall of housing 10. Motor 40 is secured on a mounting bracket 43 attached to the second lateral side of housing 10, shown also in FIG. 4, and is rotatingly coupled to the end of shaft 21 extending therefrom by a shaft coupling 42.

The opposite end of shaft 21 of first filter member 20a extends through the central hole on bearing housing 313 of coupler 31a, with pulley wheel 45a secured thereon.

Similarly, pulley wheel 45b is secured to the corresponding end of shaft 21 of second filter member 20b, extending through the central hole on bearing housing 313 of coupler 31b.

Pulley belt 46 is positioned around pulley wheels, 45a and 45b, so that second filter member 20b is rotatingly engaged with first filter member 20a.

The outer diameter of annular rim 311 of both couplers, 31a and 31b, is substantially equal with the inner diameter of the annular element 22a, positioned on the adjacent end of a corresponding filter member 20a and 20b, disposed thereover and obturates the corresponding ends of first and second filter members, 20a and 20b.

An elbow-shaped filling pipe 124 is provided on a frontal portion of housing 10 through which an alkaline cleaning fluid can be poured into lower chamber 12 therein. Filling pipe 124 is further provided with a cap 124a threadedly secureable to the outer end of filling pipe 124, and a filter washer 124b insertable therein.

A drain pipe 125 including a normally closed globe valve 125b is provided on a lowermost portion of housing 10 for the draining of cleaning fluid from lower chamber 12 therein.

Referring to FIG. 5, a side tap 126 is provided on the second lateral side of housing 10 at a predetermined position thereon, above the position of filling pipe 124, and a bottom 127 tap is provided on the lowermost portion of housing 10.

A tappet valve 51 is connected to side tap 126 with the outlet thereof being in communication with bottom tap 127 through a graduated, roughly L-shaped sight glass tube 50, made from a transparent material and connected therebetween.

Sight glass 50 enables the determination of the amount of cleaning fluid present in lower chamber 12, and also serves to enable visual inspection of the cleaning fluid to determine the level of contamination therein after extended use.

Referring to FIGS. 2 and 3, in operation, lower chamber 12 of housing 10 is partially filled with a predetermined amount of cleaning fluid through filling pipe 124, partially immersing first filter member 20a.

Exhaust gases from a diesel engine enter lower chamber 12 of housing 10 through an inlet pipe 121 provided on the frontal portion of housing 10, which is connected with the exhaust system of the diesel engine.

The exhaust gases pass through filter sleeve 23 of first filter member 20a and into the hollow interior thereof. The asbestos fibers of filter sleeve 23, permeated with cleaning fluid, act to extract carbon precipitates and noxious compounds from the exhaust gases passing therethrough.

The rotating first filter member 20a continuously sloughs off cleaning fluid from the exposed upper portion thereof while tthe immersed lower portion thereof continuously soaks in fresh cleaning fluid from below.

The exhaust gases then flow through gas conduit assembly 30 and into the interior of second filter member 20b.

Vaporized cleaning fluid in the exhaust gases is condensed and absorbed in filter sleeve 23 of second filter member 20b, with upper chamber 11 having a generally lower temperature than lower chamber 12 while in operation and the exhaust gases having been cooled during their passage through the externally mounted gas conduit assembly 30.

The rotation of second filter member 20b acts to slough off the condensed cleaning fluid thereon which is collected above partition plate 15, disposed at an angle with respect to a horizontal direction.

The cleaning fluid flows back into lower chamber 12 through a drain hole 151 formed on a lowermost portion of partition plate 15 and a return tube 152 connected therewith, with the lower end thereof extending to a position within lower chamber 12 below the level of the cleaning fluid therein.

The condensed cleaning fluid on filter sleeve 23 of second filter member 20b further acts to clean the exhaust gases passing therethrough into the interior of upper chamber 11.

The exhaust gases exit upper chamber 11 through an outlet pipe 111 provided on the uppermost portion of housing 10.

To affect optimum operation, partition plate 15 may include a thermally insulating layer to reduce the heat flow towards upper chamber 11.

Further, surfactant agents may be added to the cleaning fluid to prevent the formation of carbon sediments in lower chamber 12.

Graduated sight glass 50 facilitates the filling of lower chamber 12 with a correct amount of cleaning fluid and enables a user to determine the amount of cleaning fluid lost during operation.

Visual inspection of the cleaning fluid within sight tube 50 also enables a user to determine the amount of contamination in the cleaning fluid after extended use, indicating the times when the cleaning fluid should be changed.

The gas muffler for diesel engines of the present invention also serves to substantially reduce the concomitant noise generated by the exhaust system of the diesel engine.

Though in the embodiment described above an external electric motor was the drive source for the rotation of first and second filter members, 20a and 20b, the same members could also be rotated by the diesel engine suitably engaged therewith.

Further, though the above disclosure contains many specificities these should not be inferred as limitations on the scope of the present invention, but merely as one mode of actualization of a preferred embodiment thereof.

Many variations and modifications would occur to one skilled in the art without departing from the spirit or scope of the present invention as defined by the appended claims and their legal equivalents.

I claim:

1. An improved gas muffler for exhaust gases of a diesel engine comprising:
   a hollow housing;
   a partition plate disposed within said housing and dividing the interior of said housing into an upper chamber and a lower chamber;
   a predetermined amount of cleaning fluid of a suitable composition provided within said lower chamber;
   a first and second generally cylindrical filter members rotatably secured in respective said lower and upper chambers of said housing, each said cylindrical filter having a hollow interior and providing a central shaft, a holder frame secured on said shaft, and a gas permeable filter sleeve attached on said holder frame;
   an external rotation means for rotating said first and second filter members through a coupling means;
   an inlet in communication with said lower chamber of said housing through which exhaust gases from said diesel engine can enter therein;
   an external gas conduit with the opposite ends thereof in communication with the interiors of respective cylindrical said first and second filter members, through respective open ends thereof;
   an outlet in communication with said upper chamber of said housing through which cleaned said exhaust gases can exit therefrom;
   a flowback means provided on said partition plate through which condensed cleaning fluid in said upper chamber of said housing can drain back into said lower chamber thereof;

wherein, said exhaust gases from said diesel engine enter said lower chamber of said housing through said inlet and into the interior of the rotating said first filter member through said filter sleeve thereon, permeated with cleaning fluid cycled therethrough by the rotation thereof, which extracts carbon precipitates and noxious compounds from said exhaust gases;

said exhaust gases then pass through said external conduit to the interior of the rotating said second filter member and passes through the filter sleeve thereon into said upper chamber of said housing, which further cleans said exhaust gases and extracts vapors of said cleaning fluid, condensing in said filter sleeve thereon and being sloughed off by the rotation thereof;

cleaned said exhaust gases exit said upper chamber of said housing through said outlet thereon, and condensed said cleaning fluid in said upper chamber flows back to said lower chamber of said housing through said flowback means on said partition plate.

2. An improved gas muffler according to claim 1, wherein said gas permeable filter sleeve comprises woven asbestos fibers.

3. An improved gas muffler according to claim 2, wherein said holder frame of each said filter member comprises:
   a plurality of parallel, annular elements;
   a plurality of longitudinal elements parallel with said shaft and connected between said annular elements;
   a plurality of radial cross elements securing said annular elements to said shaft; and
   a generally disk shaped end plate obturating an end of each said filter member opposite from said gas conduit, with said asbestos filter sleeve being clamped to said annular elements.

4. An improved gas muffler according to claim 1, wherein said cleaning fluid has an alkaline Ph constant and is provided with surfactant agents.

5. An improved gas muffler according to claim 1, wherein:
   said partition plate comprises a generally planar member disposed within said housing at a substantial angle with respect to a horizontal direction;
   said flowback means thereon comprises a drain hole formed on a lowermost portion of said partition plate and a return tube, with an upper end thereof attached to and in communication with said drain hole and a lower end thereof in communication with the interior of said lower chamber of said housing, disposed at a submerged position below the level of said cleaning fluid therein.

6. An improved gas muffler according to claim 1, wherein said partition plate includes a thermally insulating layer.

7. An improved gas muffler according to claim 1, further comprising an external filling means for the filling of said lower chamber of said housing with said cleaning fluid, and an external drain means for draining of said cleaning fluid therefrom.

8. An improved gas muffler according to claim 7, wherein:
   said filling means includes a filling pipe disposed at a predetermined position on said housing, with one end thereof obturated by a releasably secured cap and having a filter element therein, the other end thereof being in communication with the interior of said lower chamber of said housing;
   said drain means includes a drain pipe, provided with a closeable valve, disposed on a lowermost portion of said housing and in communication with the interior of said lower chamber thereof.

9. An improved gas muffler according to claim 1, wherein said rotation means comprises an electric motor.

10. An improved gas muffler according to claim 1, wherein said rotation means is powered by said diesel engine.

11. An improved gas muffler according to claim 1, wherein said coupling means comprises:
   a shaft coupler rotatingly coupling said shaft of a first said filter member with said rotation means;
   a first pulley wheel rotatingly coupled with a first said filter member;
   a second pulley wheel rotatingly coupled with a second said filter member; and
   a connecting pulley belt disposed therebetween, rotatingly engaging said first filter member with said second filter member.

12. An improved gas muffler according to claim 1, wherein said gas conduit comprises:
   a pair of couplings, with each said coupling having an annular rim insertable into a respective entrance hole formed on a side of said housing being in communication with respective upper and lower chambers therein;
   a flange provided on each said coupling, adjacent to said rim and releasably securable to a respective said entrance on said housing;
   a ferrule provided on a side portion of each said coupling; and
   a cross pipe with either end thereof releasably securable to respective said ferrules on respective said couplings.

13. An improved gas muffler according to claim 12, wherein said annular rim on each said coupling obturates an end of a respective cylindrical said filter member positioned thereon.

14. An improved gas muffler according to claim 1, further comprising a level measuring means for indicating the amount of cleaning fluid within said lower chamber of said housing, and an inspection means for viewing the cleaning fluid therein.

15. An improved gas muffler according to claim 14, wherein said level measuring means and said inspection means comprises:
   a lower tap provided on a lowermost portion of said housing in communication with the interior of said lower chamber therein;
   a side tap provided on a side portion of said housing at a predetermined position thereon in communication with the interior of said lower chamber thereof;
   a valve connected to said side tap; and
   a transparent sight glass tube with graduating indicia formed thereon, an upper end thereof being connected to said valve and in communication with said side tap therethrough, and a lower end thereof being connected to said lower tap in communication therewith.

16. An improved gas muffler for exhaust gases of a diesel engine comprising:

a hollow housing;

a partition plate disposed within said housing and dividing the interior of said housing into an upper chamber and a lower chamber;

a predetermined amount of cleaning fluid of suitable composition provided within said lower chamber;

a first and second generally cylindrical filter members rotatably secured in respective said lower and upper chambers of said housing, each said cylindrical filter having a hollow interior and providing a central shaft, a holder frame secured on said shaft, and a gas permeable filter sleeve attached on said holder frame;

an external rotation means for rotating said first and second filter members through a coupling means, including a first and second pulley wheels rotatingly coupled with said shafts of respective said first and second filter members and a connecting pulley belt disposed therebetween rotatingly engaging said first and second filter members;

an inlet in communication with said lower chamber of said housing through which exhaust gases from said diesel engine can enter therein;

an external gas conduit with the opposite ends thereof in communication with the interiors of respective cylindrical said first and second filter members, through respective open ends thereof;

an outlet in communication with said upper chamber of said housing through which cleaned said exhaust gases can exit therefrom;

a flowback means provided on said partition plate through which condensed said cleaning fluid in said upper chamber of said housing can drain back into said lower chamber thereof, comprising a drain hole formed on a lowermost portion of said partition plate and a return tube, with an upper end thereof attached to and in communication with said drain hole and a lower end thereof in communication with the interior of said lower chamber of said housing, disposed at a submerged position below the level of said cleaning fluid therein;

a closeable filling pipe provided on a side portion of said housing and in communication with said lower chamber therein;

a closeable drain pipe provided on a lowermost portion of said housing and in communication with said lower chamber therein;

wherein, said exhaust gases from said diesel engine enter said lower chamber of said housing through said inlet and into the interior of the rotating said first filter member through said filter sleeve thereon, permeated with cleaning fluid cycled therethrough by the rotation thereof, which extracts carbon precipitates and noxious compounds from said exhaust gases;

said exhaust gases then pass through said external conduit to the interior of the rotating said second filter member and passes through the filter sleeve thereon into said upper chamber of said housing, which further cleans said exhaust gases and extracts vapors of said cleaning fluid, condensing in said filter sleeve thereon and being sloughed off by the rotation thereof;

cleaned said exhaust gases exit said upper chamber of said housing through said outlet thereon, and condensed said cleaning fluid in said upper chamber flows back to said lower chamber of said housing through said flowback means on said partition plate.

17. An improved gas muffler according to claim 16, wherein said gas permeable filter sleeve comprises woven asbestos fibers.

18. An improved gas muffler according to claim 17, wherein said holder frame of each said filter member comprises a plurality of parallel, annular elements, a plurality of longitudinal elements parallel with said shaft and connected between said annular elements, a plurality of radial cross elements securing said annular elements to said shaft, and a generally disk shaped end plate obturating an end of each said filter member opposite from said gas conduit, with said asbestos filter sleeve clamped to said annular elements.

19. An improved gas muffler according to claim 18, wherein said gas conduit comprises:

a pair of couplings, with each said coupling having an annular rim insertable into a respective entrance hole formed on a side of said housing being in communication with respective upper and lower chambers therein;

a flange provided on each said coupling, adjacent to said rim and releasably securable to a respective said entrance on said housing;

a ferrule provided on a side portion of each said coupling;

a cross pipe with either end thereof releasably securable to respective said ferrules on respective said couplings.

20. An improved gas muffler according to claim 19, further comprising a level measuring and inspection means comprising:

a lower tap provided on a lowermost portion of said housing in communication with the interior of said lower chamber therein;

a side tap provided on a side portion of said housing at a predetermined position thereon in communication with the interior of said lower chamber thereof;

a valve connected to said side tap; and a transparent sight glass tube with graduating indicia formed thereon, an upper end thereof being connected to said valve and in communication with said side tap therethrough, and a lower end thereof being connected to said lower tap in communication therewith.

21. An improved gas muffler according to claim 19, wherein said rotation means comprises an electric motor.

* * * * *